United States Patent
Matsuki et al.

(10) Patent No.: US 10,253,226 B2
(45) Date of Patent: Apr. 9, 2019

(54) URETHANE ADHESIVE COMPOSITION

(71) Applicant: The Yokohama Rubber Co., LTD., Minato-ku, Tokyo (JP)

(72) Inventors: Yuichi Matsuki, Hiratsuka (JP); Megumi Abe, Hiratsuka (JP); Yoriyoshi Yoneyama, Hiratsuka (JP)

(73) Assignee: The Yokohama Rubber Co., LTD., Minato-ku, Tokyo (JP)

( * ) Notice: Subject to any disclaimer, the term of this patent is extended or adjusted under 35 U.S.C. 154(b) by 148 days.

(21) Appl. No.: 15/322,998

(22) PCT Filed: Jun. 17, 2015

(86) PCT No.: PCT/JP2015/067463
§ 371 (c)(1),
(2) Date: Dec. 29, 2016

(87) PCT Pub. No.: WO2016/002518
PCT Pub. Date: Jan. 7, 2016

(65) Prior Publication Data
US 2017/0130106 A1 May 11, 2017

(30) Foreign Application Priority Data
Jun. 30, 2014 (JP) ................. 2014-135182

(51) Int. Cl.
| | | |
|---|---|---|
| C09J 175/04 | (2006.01) |
| C09J 11/04 | (2006.01) |
| C09J 11/06 | (2006.01) |
| C08K 5/548 | (2006.01) |
| C09J 175/08 | (2006.01) |
| C08G 18/48 | (2006.01) |
| C08G 18/76 | (2006.01) |
| C08G 18/12 | (2006.01) |
| C08G 18/20 | (2006.01) |
| C08G 18/30 | (2006.01) |
| C08G 18/38 | (2006.01) |
| C08K 3/04 | (2006.01) |
| C08K 3/26 | (2006.01) |

(52) U.S. Cl.
CPC ............ *C09J 175/04* (2013.01); *C08G 18/12* (2013.01); *C08G 18/20* (2013.01); *C08G 18/305* (2013.01); *C08G 18/3893* (2013.01); *C08G 18/4845* (2013.01); *C08G 18/7671* (2013.01); *C08K 5/548* (2013.01); *C09J 11/04* (2013.01); *C09J 11/06* (2013.01); *C09J 175/08* (2013.01); *C08K 3/04* (2013.01); *C08K 3/26* (2013.01); *C08K 2003/265* (2013.01)

(58) Field of Classification Search
CPC ....... C09J 175/04; C09J 175/08; C08G 18/12; C08G 18/20; C08G 18/305; C08G 18/3893; C08G 18/4845; C08G 18/7671; C08K 5/548; C08K 3/04; C08K 3/26; C08K 2003/265
USPC ........................................ 524/425
See application file for complete search history.

(56) References Cited

U.S. PATENT DOCUMENTS 6,229,036 B1 * 5/2001 Batz-Sohn ............ C07F 7/1836
    152/151
6,657,035 B1   12/2003 Nakata et al.

FOREIGN PATENT DOCUMENTS

| | | |
|---|---|---|
| JP | H07-025966 | 1/1995 |
| JP | 2000-212239 | 8/2000 |
| JP | 2005-015644 | 1/2005 |
| JP | 2005-139319 | 6/2005 |
| JP | 2014-101458 | 6/2014 |
| JP | 2014-177570 | 9/2014 |
| JP | 2014-181290 | 9/2014 |
| JP | 2015-229738 | 12/2015 |
| WO | WO 2001/53423 | 7/2001 |

OTHER PUBLICATIONS

JP 2005-015644 A, machine translation, JPO Japan Platform for Patent Information (J-PlatPat). (Year: 2005).*
International Search Report for International Application No. PCT/JP2015/067463 dated Jul. 21, 2015, 4 pages, Japan.

* cited by examiner

*Primary Examiner* — Josephine L Chang
(74) *Attorney, Agent, or Firm* — Thorpe North & Western

(57) ABSTRACT

A urethane adhesive composition of the present technology contains: a urethane prepolymer having isocyanate groups; and a monosulfide compound which has a monosulfide bond and a hydrolyzable silyl group and in which the monosulfide bond and a silicon atom in the hydrolyzable silyl group are bonded to each other.

7 Claims, No Drawings

URETHANE ADHESIVE COMPOSITION

TECHNICAL FIELD

The present technology relates to a urethane adhesive composition.

BACKGROUND ART

Conventionally, urethane-based compositions have been known as sealing materials, adhesive agents, and the like.

For example, to provide a curable resin composition having excellent adhesion to polyvinyl chloride, especially to hard polyvinyl chloride, without sacrificing superior curability and storage stability, a curable resin composition including: (A) an isocyanate silane compound which has, in average, one or more isocyanate groups and one or more hydrolyzable silyl groups in one molecule, and which can be obtained by subjecting a polyisocyanate compound having, in average, only two or more isocyanate groups bonded to a primary carbon atom, secondary carbon atom, or a carbon atom constituting an aromatic ring in one molecule and a silane compound having a secondary amino group or a mercapto group and a hydrolyzable silyl group to an addition reaction;

(B) an epoxy resin and/or (C) a urethane prepolymer which has, in average, two or more isocyanate groups bonded to a tertiary carbon atom in one molecule; and a latent moisture curing agent (D) has been proposed (e.g. Japanese Unexamined Patent Application Publication No. 2005-139319A).

Meanwhile, in recent years, resin materials (e.g. olefin-based resins, matrix resins of fiber reinforced plastic (FRP), and the like) have been used for automobile bodies in place of steel plates from the perspective of reducing weight.

However, the inventors of the present technology have found that the levels of adhesion (specific examples include initial adhesion and water resistant adhesion; hereinafter the same) to a base material (e.g. resin base materials, especially olefin resins) of the composition containing a conventional isocyanate silane as an adhesive agent may be lower than the level that are required lately.

SUMMARY

The present technology provides a urethane adhesive composition having excellent adhesion to a base material (mainly resin materials, especially olefin resins).

Note that the condition where excellent adhesion to a base material is exhibited is also described as "(having) excellent adhesion" hereinafter. Furthermore, the adhesion may include, for example, initial adhesion and/or water resistant adhesion (e.g. hot water resistant adhesion).

The inventors of the present technology have found that a urethane adhesive composition containing: a urethane prepolymer having isocyanate groups; and a monosulfide compound which has a monosulfide bond and a hydrolyzable silyl group and in which the monosulfide bond and a silicon atom in the hydrolyzable silyl group are bonded to each other can achieve excellent adhesion to base materials.

Specifically, [1] a urethane adhesive composition includes:

a urethane prepolymer having isocyanate groups; and a monosulfide compound having a monosulfide bond and a hydrolyzable silyl group, the monosulfide bond being bonded to a silicon atom contained in the hydrolyzable silyl group.

[2] The urethane adhesive composition according to [1], where the monosulfide compound is a compound represented by Formula (1) below.

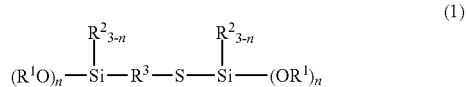

(1)

where, $R^1$ and $R^2$ are each independently a hydrocarbon group that may have a hetero atom; n is each independently an integer of 1 to 3; and $R^3$ is a hydrocarbon group.

[3] The urethane adhesive composition according to [1] or [2], where an amount of the monosulfide compound is from 0.01 to 10 parts by mass per 100 parts by mass of the urethane prepolymer.

[4] The urethane adhesive composition according to any one of [1] to [3], where the urethane prepolymer is a urethane prepolymer formed by reacting a polyether polyol and an aromatic isocyanate compound.

[5] The urethane adhesive composition according to any one of [1] to [4], further including a carbon black and/or a calcium carbonate.

[6] The urethane adhesive composition according to any one of [1] to [5], further including a reaction product of an aliphatic isocyanate compound and a secondary aminosilane and/or a reaction product of an aliphatic isocyanate compound and a hydroxy group-containing (meth)acrylamide.

[7] The urethane adhesive composition according to any one of [1] to [6], where the monosulfide compound further has a second hydrolyzable silyl group, and the second hydrolyzable silyl group is bonded to the monosulfide bond via a hydrocarbon group.

The urethane adhesive composition of the present technology has excellent adhesion to base materials.

DETAILED DESCRIPTION

The present technology is described in detail below.

The urethane adhesive composition of the present technology (composition of the present technology) is a urethane adhesive composition including:

a urethane prepolymer having isocyanate groups; and a monosulfide compound having a monosulfide bond and a hydrolyzable silyl group, the monosulfide bond being bonded to a silicon atom in the hydrolyzable silyl group.

The composition of the present technology has excellent adhesion to base materials due to the use of the monosulfide compound to the urethane prepolymer.

It is conceived that this is because a mercapto group-containing compound having a mercapto group and a silane compound having a hydroxy group and an alkoxy group are formed due to the hydrolyzation of the bond (S—Si) between the monosulfide bond and the silicon atom contained in the monosulfide compound, and the mercapto group-containing compound and/or the silane compound formed as described above contribute to adhesion to the base material.

When the monosulfide compound is a compound represented by Formula (2) below, it is conceived that a mercapto group-containing compound (3) and a silane compound (4) are formed by the hydrolysis of the compound.

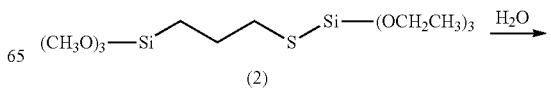

(2)

-continued

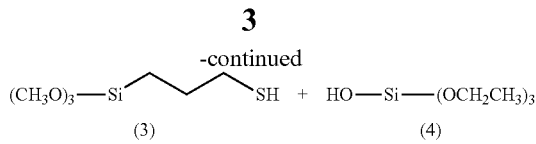

Note that the above mechanism is an inference by the inventors of the present technology, but if the mechanism of the present technology is other than that described above, it is still within the scope of the present technology.

In general, when a mercapto group-containing silane coupling agent (mercaptosilane) is added to impart adhesive function to a composition containing a urethane prepolymer, problems occur in that the isocyanate group of the terminal of the urethane prepolymer reacts with the mercapto group in the mercaptosilane during storage, thereby increasing the viscosity after the storage (e.g. 40° C. for 10 days) compared to the viscosity immediately after the blending.

As described above, since the mercaptosilane reacts with the urethane prepolymer to become a larger molecule as time passes, it is conceived that the mobility (which refers to mobility (moving capability) of an adhesion promoter such as mercaptosilane to reach the interface between an adherend surface and an adhesive layer before the adhesive agent is hardened) of the mercaptosilane bonded to the urethane prepolymer is deteriorated, and the mercaptosilane is less likely to be quickly transferred to the interface (adhesive agent layer/adherend) after application of the adhesive agent.

As a result, the composition containing the urethane prepolymer and the mercaptosilane cannot always exhibit sufficient adhesion (adhesive strength) after storage.

Because of this, when the urethane prepolymer and the mercaptosilane are stored separately, workability is poor because mixing is required on site.

Furthermore, conventional mercaptosilane typically has a strong odor, thereby making the working environment worse due to the use of mercaptosilane.

Therefore, use of mercaptosilane in a urethane prepolymer has been conventionally difficult when storage stability and the like are taken into consideration.

On the other hand, in the monosulfide compound contained in the composition of the present technology, the mercapto group is protected before undergoing hydrolysis, and the monosulfide compound is thus stable to a compound having an isocyanate group (urethane prepolymer), exhibits excellent storage stability, excellent mobility, and excellent workability.

Furthermore, since the mercapto group of the monosulfide compound contained in the composition of the present technology is protected, the monosulfide compound has almost no odor and working environment is not deteriorated even when the compound is used.

The urethane prepolymer will be described below. The urethane prepolymer contained in the composition of the present technology is a polymer having a plurality of isocyanate groups in one molecule.

The urethane prepolymer preferably has an isocyanate group at a molecular terminal.

As the urethane prepolymer, conventionally known urethane prepolymers can be used. For example, a reaction product, obtained by reacting a polyisocyanate compound with a compound having at least two active hydrogen-containing groups in one molecule (hereinafter, abbreviated as "active hydrogen compound") in a manner that the amount of the isocyanate group is in excess relative to the amount of the active hydrogen-containing groups, or the like can be used.

In the present technology, "active hydrogen-containing group" indicates "group containing an active hydrogen". Examples of the active hydrogen-containing group include a hydroxy group, an amino group, and an imino group.

Polyisocyanate Compound

The polyisocyanate compound used during production of the urethane prepolymer is not particularly limited as long as the polyisocyanate compound has two or more isocyanate groups in one molecule.

Examples of the polyisocyanate compound include aromatic polyisocyanate compounds, such as tolylene diisocyanate (TDI; e.g. 2,4-tolylene diisocyanate and 2,6-tolylene diisocyanate), diphenylmethane diisocyanate (MDI; e.g. 4,4'-diphenylmethane diisocyanate and 2,4'-diphenylmethane diisocyanate), 1,4-phenylene diisocyanate, polymethylene polyphenylene polyisocyanate, xylylene diisocyanate (XDI), tetramethylxylylene diisocyanate (TMXDI), tolidine diisocyanate (TODI), 1,5-naphthalene diisocyanate (NDI), and triphenylmethane triisocyanate; aliphatic and/or alicyclic polyisocyanates such as hexamethylene diisocyanate (HDI), trimethylhexamethylene diisocyanate (TMHDI), lysine diisocyanate, norbornane diisocyanate (NBDI), transcyclohexane-1,4-diisocyanate, isophorone diisocyanate (IPDI), bis(isocyanate methyl)cyclohexane ($H_6$XDI), and dicyclohexylmethane diisocyanate ($H_{12}$MDI); carbodiimide-modified polyisocyanates thereof; and isocyanurate-modified polyisocyanates thereof.

The polyisocyanate compound may be used alone or a combination of two or more types of the polyisocyanate compounds may be used.

Among these, an aromatic polyisocyanate is preferable, and MDI is more preferable, from the perspective of excellent curability.

Active Hydrogen Compound

The compound having two or more active hydrogen-containing groups in one molecule (active hydrogen compound) that is used during production of the urethane prepolymer is not particularly limited. Examples of the active hydrogen-containing group include a hydroxy (OH) group, an amino group, and an imino group.

Preferred examples of the active hydrogen compound include polyol compounds having two or more hydroxy (OH) groups in one molecule, polyamine compounds having two or more amino groups and/or imino groups in one molecule, and the like. Among these, a polyol compound is preferable.

The molecular weight, skeleton, and the like of the polyol compound are not particularly limited as long as the polyol compound is a compound having two or more OH groups. Specific examples thereof include polyether polyols; polyester polyols; polymer polyols having a carbon-carbon bond in a main chain skeleton, such as acrylic polyols, polybutadiene diols, and hydrogenated polybutadiene polyols; low-molecular-weight polyhydric alcohols; and mixed polyols of these. Among these, a polyether polyol is exemplified as an example of preferable aspects.

The polyether polyol is not particularly limited as long as the polyether polyol is a compound having a polyether as a main chain and having two or more hydroxy groups. "Polyether" is a group having two or more ether bonds, and specific examples thereof include a group having a total of two or more of structural units: —$R^a$—O—$R^b$—. Note that, in the structural unit, $R^a$ and $R^b$ each independently represent a hydrocarbon group. The hydrocarbon group is not particularly limited. Examples thereof include a straight-chain alkylene group having from 1 to 10 carbons.

Examples of the polyether polyol include a polyoxyethylene diol (polyethylene glycol), polyoxypropylene diol (polypropylene glycol; PPG), polyoxypropylene triol, ethylene oxide/propylene oxide copolymer, polytetramethylene ether glycol (PTMEG), polytetraethylene glycol, sorbitol polyol, and the like.

The polyether polyol is preferably polypropylene glycol or polyoxypropylene triol from the perspective of excellent miscibility with a polyisocyanate compound.

The weight average molecular weight of the polyether polyol is preferably from 500 to 20,000 because the viscosity of the urethane prepolymer, obtained by a reaction with an isocyanate compound, exhibits an appropriate fluidity at the ambient temperature. In the present technology, the weight average molecular weight is a value obtained by GPC analysis (solvent: tetrahydrofuran (THF)) based on calibration with polystyrene.

The active hydrogen compound may be used alone, or a combination of two or more types of the active hydrogen compounds may be used.

The urethane prepolymer is preferably a urethane prepolymer formed by reacting a polyether polyol and an aromatic polyisocyanate compound, from the perspective of achieving even better adhesion and excellent curability.

The urethane prepolymer may be used alone, or a combination of two or more types of the urethane prepolymers may be used.

The method of producing the urethane prepolymer is not particularly limited. For example, the urethane prepolymer can be produced by using a polyisocyanate compound in a manner that from 1.5 to 2.5 mol of isocyanate group is reacted per 1 mol of the active hydrogen-containing group (e.g. hydroxy group) contained in the active hydrogen compound, and mixing these to perform a reaction.

The urethane prepolymer may be used alone, or a combination of two or more types of the urethane prepolymers may be used.

The monosulfide compound will be described below.

The monosulfide compound contained in the composition of the present technology is a compound which has a monosulfide bond and a hydrolyzable silyl group and in which the monosulfide bond and a silicon atom in the hydrolyzable silyl group are bonded to each other.

The hydrolyzable group (the hydrolyzable group bonds to a silicon atom) contained in the hydrolyzable silyl group is not particularly limited. Examples of the hydrolyzable group include groups represented by R—O— (R is a hydrocarbon group that may have a hetero atom). Examples of the hydrocarbon group represented by R include alkyl groups, cycloalkyl groups, aryl groups (e.g. aryl groups having from 6 to 10 carbons), and combinations of these. The hydrocarbon group may have a hetero atom such as an oxygen atom, a nitrogen atom, or a sulfur atom.

R is preferably an alkyl group, and more preferably an alkyl group having from 1 to 10 carbons.

The number of the hydrolyzable group contained in one hydrolyzable silyl group may be 1 to 3. From the perspective of achieving even better adhesion, the number of the hydrolyzable group contained in one hydrolyzable silyl group is preferably 3.

The hydrolyzable silyl group is preferably an alkoxysilyl group.

When the number of the hydrolyzable group contained in one hydrolyzable silyl group is 1 to 2, the group that can bond to a silicon atom of the hydrolyzable silyl group is not particularly limited. Examples thereof include a hydrocarbon group that may have a hetero atom. Examples of the hydrocarbon group include alkyl groups (e.g. alkyl groups having from 1 to 20 carbons), cycloalkyl groups, aryl groups (e.g. aryl groups having from 6 to 10 carbons), aralkyl groups (e.g. aralkyl groups having from 7 to 10 carbons), alkenyl groups (e.g. alkenyl groups having from 2 to 10 carbons), and combinations of these.

When the hydrocarbon group has a hetero atom, for example, at least one of the carbon atoms in the hydrocarbon group having two or more carbons may be substituted with hetero atom(s) or functional group(s) having a hetero atom (e.g. functional group that is at least divalent), and/or at least one of the hydrogen atoms in the hydrocarbon group (in this case, the number of carbons is not limited) may be substituted with functional group(s) having a hetero atom (e.g. functional group that is monovalent).

In the monosulfide bond, groups that is bonded to the monosulfide bond other than the hydrolyzable silyl group described above are not particularly limited.

From the perspective of achieving even better adhesion, an example of a preferable aspect is one in which the monosulfide compound further has a second hydrolyzable silyl group in addition to the hydrolyzable silyl group bonded to the monosulfide compound. In this case, the hydrolyzable silyl group bonded to the monosulfide bond via the silicon atom is a first hydrolyzable silyl group.

The second hydrolyzable silyl group is similar to the hydrolyzable silyl group bonded to the monosulfide bond.

The second hydrolyzable silyl group can bond to the monosulfide bond via a hydrocarbon group. The hydrocarbon group is not particularly limited. Examples of the hydrocarbon group include alkyl groups (e.g. alkyl groups having from 1 to 10 carbons), cycloalkyl groups, aryl groups, and combinations of these.

An example of a preferable aspect is one in which the hydrocarbon group which is arranged in between the second hydrolyzable silyl group and the monosulfide bond is a divalent hydrocarbon group. Examples of the divalent hydrocarbon group include alkylene groups (e.g. alkylene groups having from 1 to 10 carbons), cycloalkylene groups, arylene groups, and combinations of these.

The hydrocarbon group may be a straight-chain or branched-chain hydrocarbon group.

From the perspective of achieving even better adhesion, the monosulfide compound is preferably a compound represented by Formula (1) below.

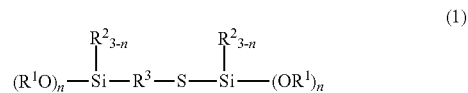

(1)

In the formula, $R^1$ and $R^2$ are each independently a hydrocarbon group that may have a hetero atom; n is each independently an integer of 1 to 3; and $R^3$ is a hydrocarbon group.

The hydrocarbon group that may have a hetero atom of $R^1$ similar to the hydrocarbon group that may have a hetero atom represented by R contained in the group represented by R—O— (e.g. alkoxy group) described above.

The hydrocarbon group that may have a hetero atom of $R^2$ is similar to the hydrocarbon group that may have a hetero atom as the group that can bond to the silicon atom of the hydrolyzable silyl group described above when the number of the alkoxy group contained in one hydrolyzable silyl group is 1 to 2.

n is preferably each independently 3.

The hydrocarbon group of $R^3$ is similar to the hydrocarbon group which is arranged between the second hydrolyzable silyl group and the monosulfide bond described above. Examples of the hydrocarbon group include m is preferably an integer of 1 to 5.

From the perspective of achieving even better adhesion, the monosulfide compound is preferably a compound represented by Formula (2) below.

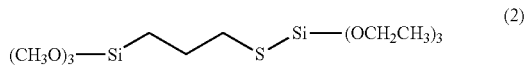

The method of producing the monosulfide compound is not particularly limited. Examples thereof include conventionally known methods such as a method in which mercaptosilane and tetraalkoxysilane are heated in the presence of an amine-based or metal-based catalyst and then resulting alcohol is continuously or discontinuously distilled off.

The monosulfide compound may be used alone or a combination of two or more types of the monosulfide compound may be used.

The amount of the monosulfide compound is preferably from 0.01 to 10 parts by mass, and more preferably from 0.02 to 1.0 part by mass, per 100 parts by mass of the urethane prepolymer from the perspective of achieving even better adhesion.

The composition of the present technology preferably further contains a carbon black and/or a calcium carbonate from the perspectives of achieving even better adhesion, making the hardness of the resulting cured product high, and achieving excellent thixotropy.

The carbon black that can be used in the composition of the present technology is not particularly limited. Examples thereof include conventionally known carbon blacks. The carbon black may be used alone or a combination of two or more types of the carbon blacks may be used.

In the present technology, the amount of the carbon black is preferably from 20 to 80 parts by mass, and more preferably from 40 to 60 parts by mass, per 100 parts by mass of the urethane prepolymer.

The calcium carbonate that can be used in the composition of the present technology is not particularly limited. Examples thereof include heavy calcium carbonate, precipitated calcium carbonate (light calcium carbonate), and colloidal calcium carbonate. For example, the calcium carbonate may have undergone a surface treatment with a fatty acid, a fatty acid ester, or the like. The calcium carbonate may be used alone, or a combination of two or more types of the calcium carbonates may be used.

In the present technology, the amount of the calcium carbonate is preferably from 20 to 80 parts by mass, and more preferably from 40 to 60 parts by mass, per 100 parts by mass of the urethane prepolymer.

From the perspective of achieving even better adhesion, the composition of the present technology preferably further contains a reaction product of an aliphatic isocyanate compound and a secondary aminosilane (this reaction product is hereinafter also referred to as "reaction product A") and/or a reaction product of an aliphatic isocyanate compound and a hydroxy group-containing (meth)acrylamide (this reaction product is hereinafter also referred to as "reaction product B").

The aliphatic isocyanate compound used in the production of the reaction product A or the reaction product B is not particularly limited as long as the aliphatic isocyanate compound is an aliphatic hydrocarbon compound having one or more isocyanate groups in one molecule. The aliphatic isocyanate compound is preferably an aliphatic polyisocyanate compound having two or more isocyanate groups in one molecule.

Examples of the aliphatic polyisocyanate compound include diisocyanate compounds, such as hexamethylene diisocyanate and pentamethylene diisocyanate, and modified products (e.g. biuret, isocyanurate, and allophanate) of these. Among these, an allophanate or biuret of hexamethylene diisocyanate is preferable.

The secondary aminosilane used in the production of the reaction product A is not particularly limited as long as the secondary aminosilane is a compound having an imino group (—NH—) and a hydrolyzable silyl group.

The hydrolyzable silyl group is similar to those described above.

Examples of the hydrolyzable silyl group include alkoxysilyl groups.

The imino group (—NH—) can bond to the hydrolyzable silyl group via a hydrocarbon group. Examples of the hydrocarbon group include alkyl groups, cycloalkyl groups, aryl groups, and combinations of these.

The secondary aminosilane may have one or two hydrolyzable silyl groups in one molecule.

Examples of the secondary aminosilane having one hydrolyzable silyl group in one molecule include 3-(n-butylamino)propyltrimethoxysilane and N-phenyl-γ-aminopropyltrimethoxysilane.

Examples of the secondary aminosilane having two hydrolyzable silyl groups in one molecule include N,N-bis[(3-trimethoxysilyl)propyl]amine, N,N-bis[(3-triethoxysilyl)propyl]amine, and N,N-bis[(3-tripropoxysilyl)propyl]amine.

The production of the reaction product A is not particularly limited. Examples thereof include conventionally known production methods.

The reaction product A may be used alone, or a combination of two or more types of the reaction products A may be used.

When the aliphatic isocyanate compound used in the production of the reaction product A is an aliphatic polyisocyanate compound, the reaction product A may be a mixture containing at least two types selected from the group consisting of compounds formed by reacting some of the isocyanate groups contained in the aliphatic polyisocyanate compound with the secondary aminosilane and compounds formed by reacting all of the isocyanate groups with the secondary aminosilane.

Furthermore, the reaction product A may further contain an aliphatic isocyanate compound that was not reacted with the secondary aminosilane.

The hydroxy group-containing (meth)acrylamide used in the production of the reaction product B is not particularly limited as long as the hydroxy group-containing (meth)acrylamide is a (meth)acrylamide compound having a hydroxy group and a (meth)acrylamide group. In the present technology, the (meth)acrylamide group is a group represented by $CH_2$=CR—CO—N (R is a hydrogen atom or a methyl group).

Examples of the hydroxy group-containing (meth)acrylamide include a compound in which a hydroxy group is bonded to a nitrogen atom of the (meth)acrylamide group via a hydrocarbon group. Examples of the hydrocarbon group include alkyl groups, cycloalkyl groups, aryl groups, and combinations of these.

The hydroxy group-containing (meth)acrylamide may have one hydroxy group or two or more hydroxy groups in one molecule.

Examples of the hydroxy group-containing (meth)acrylamide include N-hydroxy group-containing alkyl(meth)acrylamide, and specific examples thereof include N-hydroxyethyl(meth)acrylamide (HEAA).

The production of the reaction product B is not particularly limited. Examples thereof include conventionally known production methods.

The reaction product B may be used alone, or a combination of two or more types of the reaction products B may be used.

When the aliphatic isocyanate compound used in the production of the reaction product B is an aliphatic polyisocyanate compound, the reaction product B may be a mixture containing at least two types selected from the group consisting of compounds formed by reacting some of the isocyanate groups contained in the aliphatic polyisocyanate compound with the hydroxy group-containing (meth)acrylamide and compounds formed by reacting all of the isocyanate groups with the hydroxy group-containing (meth)acrylamide.

Furthermore, the reaction product B may further contain an aliphatic isocyanate compound that was not reacted with the hydroxy group-containing (meth)acrylamide.

From the perspective of achieving even better adhesion, the amount of the reaction product A and/or the reaction product B (in the case of the reaction product A and the reaction product B, the total amount thereof) is preferably from 0.5 to 10 parts by mass, and more preferably from 2 to 6 parts by mass, per 100 parts by mass of the urethane prepolymer.

The composition of the present technology may contain, as necessary, various additives, such as monosulfide compounds other than the predetermined monosulfide compounds; adhesion promoters other than the reaction product A and the reaction product B; silane coupling agents; fillers other than carbon black and calcium carbonate; curing catalysts such as dimorpholinodiethyl ether; plasticizers such as diisononyl phthalate; antiaging agents, antioxidants, pigments (dyes), thixotropic agents, ultraviolet absorbers, flame retardants, surfactants (including leveling agents), dispersing agents, dehydrating agents, adhesion promoters, and antistatic agents, in a range that does not inhibit the object of the present technology. The amounts of the additives are not particularly limited. For example, the amounts of the additives may be the same as conventionally known amounts.

The method of producing the composition of the present technology is not particularly limited. For example, the production may be performed by blending the urethane prepolymer and the monosulfide compound as well as the carbon black and/or the calcium carbonate, the reaction product A and/or the reaction product B, and the additive that may be used as necessary, and mixing using an agitator.

Examples of the base material to which the composition of the present technology can be applied include plastics, glass, rubbers, metals, and the like.

Examples of the plastic include polymers of propylene-, ethylene-, and/or cycloolefin-based monomers. The polymers described above may be homopolymers, copolymers, or hydrogenated products.

Specific examples of the plastic include olefin resins, such as polypropylene, polyethylene, cycloolefin polymers (COP), and cycloolefin copolymers (COC), polyester resins, such as polyethylene terephthalate (PET) and polybutylene terephthalate (PBT), polymethyl methacrylate resins (PMMA resins), polycarbonate resins, polystyrene resins, acrylonitrile-styrene copolymer resins, polyvinyl chloride resins, acetate resins, acrylonitrile-butadiene-styrene resins (ABS resins), and hardly adhesive resins, such as polyamide resins.

Note that "COC" indicates cycloolefin copolymers, such as copolymers of tetracyclododecene and olefin such as ethylene.

Furthermore, "COP" indicates cycloolefin polymers, such as polymers obtained by, for example, subjecting norbornenes to ring-opening polymerization and hydrogenation.

The base material may have undergone a surface treatment. Examples of the surface treatment include flame treatment, corona treatment, and ITRO treatment. These treatments are not particularly limited. Examples thereof include conventionally known treatments.

The method of applying the composition of the present technology to the base material is not particularly limited. Examples thereof include conventionally known methods.

When the composition of the present technology is used, excellent adhesion can be exhibited without using a primer to the base material.

The composition of the present technology can be cured by moisture. For example, the composition of the present technology can be cured in the condition of 5 to 90° C. at a relative humidity of 5 to 95 (% RH).

Examples of the use of the composition of the present technology include direct glazing adhesives, sealants for automobiles, and sealants for building components.

Furthermore, examples of the method of use of the composition of the present technology include a two-part composition which is a combination of the composition of the present technology as a main agent and a curing agent.

The curing agent (curing agent in a broad sense) used in this case may be, for example, a curing agent containing a compound having two or more active hydrogen-containing groups in one molecule (curing agent in a narrow sense).

Compound having Two or More Active Hydrogen-Containing Groups in One Molecule

The compound having two or more active hydrogen-containing groups in one molecule (curing agent in a narrow sense) contained in the curing agent (curing agent in a broad sense) is a component that cures the urethane prepolymer contained in the main agent described above.

Examples of the compound having two or more active hydrogen-containing groups in one molecule contained in the curing agent include the same compounds as those exemplified as the active hydrogen compound used during the production of the urethane prepolymer. Among these, a polyol compound is preferable. The polyol compound is the same as the polyol compounds described above.

In particular, the polyol compound is preferably a polyether polyol, from the perspective of achieving even better adhesion and excellent curability. The polyether polyol is the same as the polyether polyol described above.

The compound having two or more active hydrogen-containing groups in one molecule contained in the curing agent may be used alone, or a combination of two or more types thereof may be used.

The molar ratio of the isocyanate group contained in the urethane prepolymer to the active hydrogen-containing group contained in the compound having two or more active hydrogen-containing groups in one molecule contained in the curing agent (isocyanate group/active hydrogen-containing group) is preferably from 1.0 to 20, and more preferably from 1.4 to 10, from the perspective of achieving even better adhesion and excellent curability.

EXAMPLES

The present technology will be described below in detail using examples. However, the present technology is not limited to such examples.
Production of Adhesive Composition
The components shown in Table 1 below were used in compositions (part by mass) shown in Table 1 and mixed by an agitator to produce an adhesive composition.
Evaluation
For the adhesive compositions produced as described above, adhesion was evaluated by the methods described below. The results are shown in Table 1.
Adhesion (Shear Strength)
Two pieces of adherends formed by subjecting one face of a substrate (width: 25 mm, length: 120 mm, thickness: 3 mm) formed from a polypropylene resin (trade name: Nobrene, manufactured by Sumitomo Chemical Co., Ltd.) to a flame treatment were prepared.

After the adherends were flame-treated, it was confirmed that the wettability on the surface of the resin was 45.0 mN/m or greater, using the Wetting Tension Test Mixture (manufactured by Wako Pure Chemical Industries, Ltd.).

The adhesive composition immediately after the preparation (mixing) was then applied to a surface of one adherend (the face on which the flame treatment was performed) in a manner that the width was 25 mm and the length was 10 mm. Thereafter, the coated surface was adhered to a surface of another adherend (the face on which the flame treatment was performed) and compression-bonded in a manner that the thickness of the adhesive composition became 5 mm, to produce a test sample.

After the produced test sample was left under the following condition, tensile test (tensile test speed of 50 mm/min at 20° C.) was performed at 23° C. in accordance with JIS (Japanese Industrial Standard) K 6850:1999 to measure the shear strength (MPa).

Condition 1: left for 3 days in a condition of 23° C. and 50% RH (initial)

Condition 2: left for 3 days in a condition of 23° C. and 50% RH, and then immersed in a hot water at 60° C. for 3 days The case where the shear strength was 2.0 MPa or greater was evaluated as having high adhesive strength and excellent adhesion.

Adhesion (Failure State)

For the test sample used for measuring the shear strength, failure state was visually observed, and the case where the cohesive failure was observed in the adhesive was evaluated as "CF", and the case where the interfacial failure was observed between the adherend and the adhesive was evaluated as "AF". The numerical values written after "CF" or "AF" represent approximate areas (%) occupied by the failure states on the adhering surface.

The case where the area occupied by CF was 80% or greater was evaluated as having excellent failure state and excellent adhesion.

TABLE 1

| | | | Working Example 1 | Working Example 2 | Working Example 3 |
|---|---|---|---|---|---|
| Base | Urethane prepolymer | | 100.0 | 100.0 | 100.0 |
| | Carbon black | #200MP | 48.6 | 48.6 | 48.6 |
| | Calcium carbonate | Super S | 45.5 | 45.5 | 45.5 |
| | Plasticizer | DINP | 41.0 | 41.0 | 41.0 |
| | Catalyst | DMDEE | 0.5 | 0.5 | 0.5 |
| | Reaction product A1 | | | 3.54 | 3.54 |
| | Reaction product B1 | | | | |
| | Monosulfide compound | | 0.35 | 0.02 | 0.24 |
| | Polysulfide compound | | | | |
| | Mercaptosilane | | | | |
| Adhesiveness | 23° C. and 50% RH for 3 days (initial) | Shear strength | 4.2 MPa | 4.0 MPa | 4.2 MPa |
| | | Failure state | CF85 AF15 | CF85 AF15 | CF90 AF10 |
| | Initial + immersed in 60° C. hot water for 3 days | Shear strength | 3.5 MPa | 3.6 MPa | 4.2 MPa |
| | | Failure state | CF80 AF20 | CF80 AF20 | CF95 AF5 |

| | | | Working Example 4 | Working Example 5 | Working Example 6 |
|---|---|---|---|---|---|
| Base | Urethane prepolymer | | 100.0 | 100.0 | 100.0 |
| | Carbon black | #200MP | 48.6 | 48.6 | 48.6 |
| | Calcium carbonate | Super S | 45.5 | 45.5 | 45.5 |
| | Plasticizer | DINP | 41.0 | 41.0 | 41.0 |
| | Catalyst | DMDEE | 0.5 | 0.5 | 0.5 |
| | Reaction product A1 | | 3.54 | | |
| | Reaction product B1 | | | 3.54 | 3.54 |
| | Monosulfide compound | | 0.47 | 0.02 | 0.35 |
| | Polysulfide compound | | | | |
| | Mercaptosilane | | | | |

TABLE 1-continued

| | | | | | |
|---|---|---|---|---|---|
| Adhesiveness | 23° C. and 50% RH for 7 days (initial) | Shear strength Failure state | 4.8 MPa CF95 AF5 | 3.8 MPa CF90 AF10 | 4.0 MPa CF90 AF10 |
| | Initial + immersed in 60° C. hot water for 3 days | Shear strength Failure state | 4.8 MPa CF100 | 3.6 MPa CF95 AF5 | 4.0 MPa CF100 |

| | | | Comparative Example 1 | Comparative Example 2 |
|---|---|---|---|---|
| Base | Urethane prepolymer | | 100.0 | 100.0 |
| | Carbon black | #200MP | 48.6 | 48.6 |
| | Calcium carbonate | Super S | 45.5 | 45.5 |
| | Plasticizer | DINP | 41.0 | 41.0 |
| | Catalyst | DMDEE | 0.5 | 0.5 |
| | Reaction product A1 | | 3.54 | 3.54 |
| | Reaction product B1 | | | |
| | Monosulfide compound | | | |
| | Polysulfide compound | | | 0.35 |
| | Mercaptosilane | | | |
| Adhesiveness | 23° C. and 50% RH for 7 days (initial) | Shear strength Failure state | 1.6 MPa AF100 | 1.6 MPa AF100 |
| | Initial + immersed in 60° C. hot water for 3 days | Shear strength Failure state | 0.8 MPa AF100 | 0.8 MPa AF100 |

| | | | Comparative Example 3 |
|---|---|---|---|
| Base | Urethane prepolymer | | 100.0 |
| | Carbon black | #200MP | 48.6 |
| | Calcium carbonate | Super S | 45.5 |
| | Plasticizer | DINP | 41.0 |
| | Catalyst | DMDEE | 0.5 |
| | Reaction product A1 | | 3.54 |
| | Reaction product B1 | | |
| | Monosulfide compound | | |
| | Polysulfide compound | | |
| | Mercaptosilane | | 0.35 |
| Adhesiveness | 23° C. and 50% RH for 7 days (initial) | Shear strength Failure state | 1.8 MPa CF20 AF80 |
| | Initial + immersed in 60° C. hot water for 3 days | Shear strength Failure state | 1.2 MPa CF10 AF90 |

Details of the components described in Table 1 are as follows.

Urethane prepolymer: urethane prepolymer produced by mixing 70 parts by mass of polyoxypropylene diol (trade name: SANNIX PP2000, manufactured by Sanyo Chemical Industries, Ltd.; weight average molecular weight: 2,000), polyoxypropylene triol (trade name: SANNIX GP3000, manufactured by Sanyo Chemical Industries, Ltd.; weight average molecular weight: 3,000), and MDI (trade name: Sumidur 44S, manufactured by Sumika Bayer Urethane Co., Ltd.) in a manner that NCO/OH (molar ratio) was 2.0, and reacting the mixture in a condition at 80° C. for 5 hours.

Carbon black: trade name: #200 MP, manufactured by NSCC Carbon Co., Ltd.

Calcium carbonate: heavy calcium carbonate, trade name: Super S, manufactured by Maruo Calcium Co., Ltd.

Plasticizer DINP: diisononyl phthalate, manufactured by J-Plus Co., Ltd.

Catalyst DMDEE: dimorpholinodiethyl ether, trade name: UCAT-660M, manufactured by San-Apro Ltd.

Reaction Product of Aliphatic Isocyanate Compound and Secondary Aminosilane (Reaction Product A1)

A reaction product was obtained by mixing 47.2 g of the secondary aminosilane (3-(N-phenyl)aminopropyltrimethoxysilane) and 100 g of the aliphatic isocyanate compound (biuret of hexamethylene diisocyanate (HDI); trade name: Takenate D-165N (manufactured by Mitsui Chemicals, Inc.; average of three isocyanate groups are contained in one molecule)) (at this time, molar ratio of NCO/NH was 3), and reacting these in a nitrogen atmosphere at 80° C. for 6 hours.

The obtained reaction product was a mixture at least containing a compound formed by reacting the NH group of the secondary aminosilane and one isocyanate group among the three isocyanate groups contained in the aliphatic isocyanate compound, a compound formed by reacting the NH group of the secondary aminosilane and the two isocyanate groups, a compound formed by reacting the NH group of the secondary aminosilane and the three isocyanate groups, and an unreacted isocyanate compound.

Reaction Product of Aliphatic Isocyanate Compound and Hydroxy Group-Containing Acrylamide (Reaction Product B1)

A reaction product was obtained by mixing 9.4 g of N-(2-hydroxyethyl)acrylamide (HEAA) and 89.6 g of aliphatic isocyanate compound (allophanate of hexamethylene diisocyanate (HDI); trade name: Takenate D-178NL; manufactured by Mitsui Chemicals, Inc.; average of two isocyanate groups are contained in one molecule) (at this time, molar ratio of NCO/OH was 5), and reacting these in a nitrogen atmosphere at 60° C. for 9 hours.

The obtained reaction product was a mixture at least containing a compound formed by reacting one isocyanate group of the two isocyanate groups contained in the aliphatic isocyanate compound and a hydroxy group of HEAA (in addition to an acrylamide group and an allophanate bond, containing a urethane bond and an isocyanate group in one molecule), a compound formed by reacting both of the two isocyanate groups contained in the isocyanate compound and a hydroxy group of HEAA, and an unreacted isocyanate compound.

Monosulfide compound: compound represented by Formula (2) below.

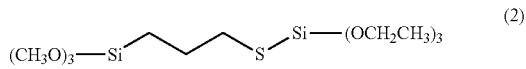

Polysulfide compound: bis(triethoxysilylpropyl)tetrasulfide; trade name: Si 69, manufactured by Evonik Degussa Mercaptosilane: 3-mercaptopropyltrimethoxysilane; trade name: A-189; manufactured by Momentive Performance Materials Inc.

As is clear from the results shown in Table 1, Comparative Example 1, which contained no monosulfide compound, exhibited poor adhesion.

Comparative Example 2, which contained no monosulfide compound but contained a polysulfide compound in place of the monosulfide compound, exhibited poor adhesion.

Comparative Example 3, which contained no monosulfide compound but contained mercaptosilane in place of the monosulfide compound, exhibited poor adhesion.

Compared to these, Working Examples 1 to 6 exhibited excellent adhesion to base materials. Furthermore, Working Examples 1 to 6 exhibited excellent adhesion without using a primer.

When Working Examples 2 to 4 are compared, when the amount of the monosulfide compound was greater, better adhesion was exhibited. Similar results were also obtained in Working Examples 5 and 6.

When Working Example 1 and Working Examples 2 to 6 are compared, Working Examples 2 to 6, which further contained the reaction product A and/or the reaction product B, exhibited even better hot water resistant adhesion than that of Working Example 1.

When Working Example 2 and Working Example 5 are compared, Working Example 5 (the reaction product B contained a (meth)acrylamide group) exhibited even better failure state and superior adhesion than those of Working Example 2 (reaction product A contained a hydrolyzable silyl group).

The invention claimed is:

1. A urethane adhesive composition including:
   a urethane prepolymer having isocyanate groups; and
   a monosulfide compound having a monosulfide bond and a hydrolyzable silyl group, the monosulfide bond being bonded to a silicon atom contained in the hydrolyzable silyl group;
   wherein an amount of the monosulfide compound is from 0.01 to 0.2 parts by mass per 100 parts by mass of the urethane prepolymer.

2. The urethane adhesive composition according to claim 1, wherein the monosulfide compound further has a second hydrolyzable silyl group, and the second hydrolyzable silyl group is bonded to the monosulfide bond via a hydrocarbon group.

3. The urethane adhesive composition according to claim 1, wherein the monosulfide compound is a compound represented by Formula (1):

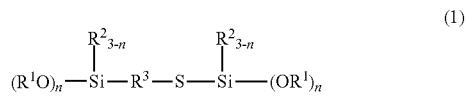

where, $R^1$ and $R^2$ are each independently a hydrocarbon group that may have a hetero atom; n is each independently an integer of 1 to 3; and $R^3$ is a hydrocarbon group.

4. The urethane adhesive composition according to claim 1, wherein the urethane prepolymer is a urethane prepolymer formed by reacting a polyether polyol and an aromatic isocyanate compound.

5. The urethane adhesive composition according to claim 1, further including at least one type of reaction product selected from the group consisting of reaction products of an aliphatic isocyanate compound and a secondary aminosilane and reaction products of an aliphatic isocyanate compound and a hydroxy group-containing (meth)acrylamide.

6. The urethane adhesive composition according to claim 1, further including at least one type selected from the group consisting of a carbon black and a calcium carbonate.

7. The urethane adhesive composition according to claim 1, further comprising carbon black in an amount of from 20 to 60 parts by mass per 100 parts by mass of the urethane prepolymer.

* * * * *